Jan. 31, 1956  C. A. HAMMERBERG  2,733,153
MEAT-SHAPING METHOD
Original Filed May 12, 1947
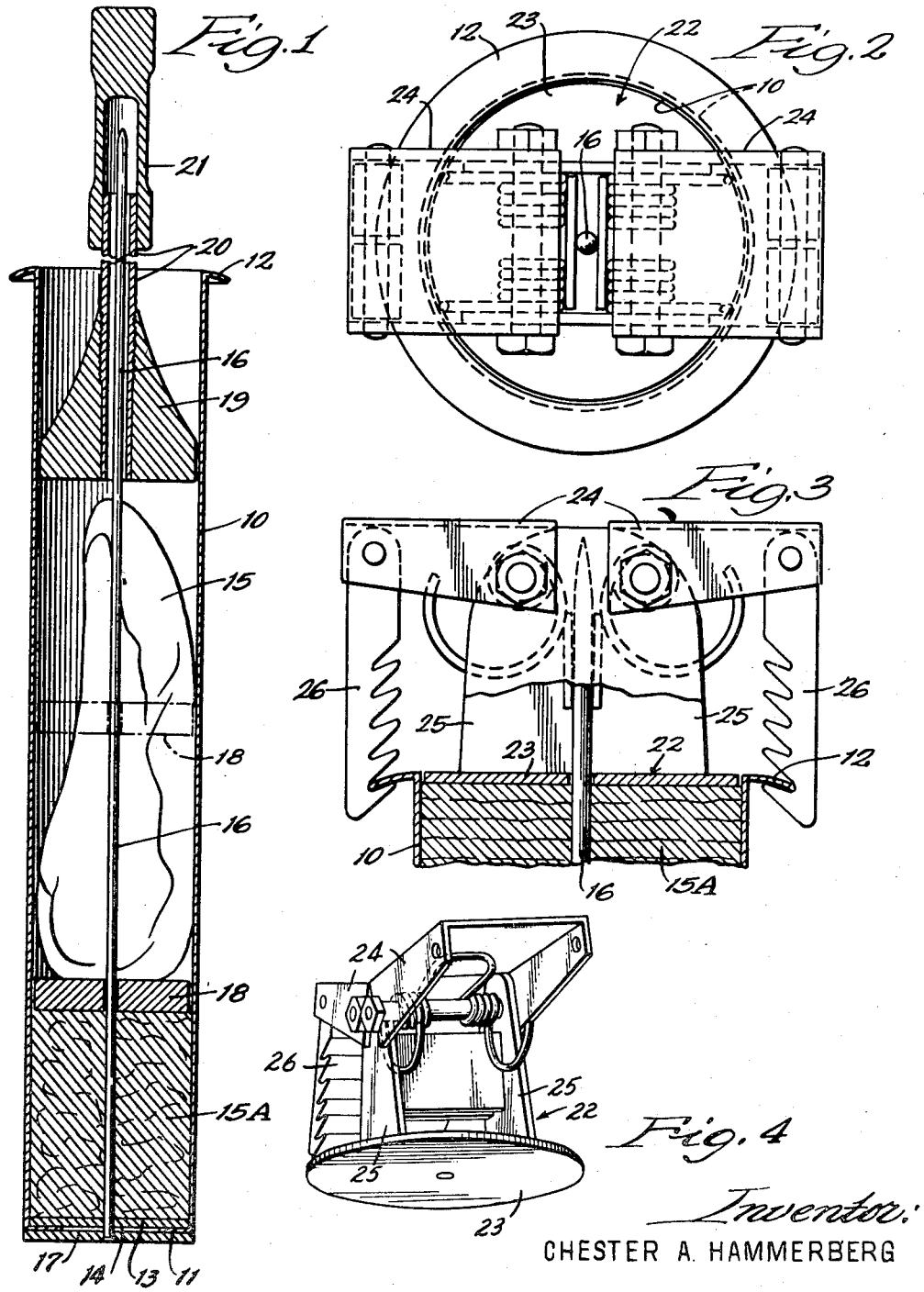
CHESTER A. HAMMERBERG
By Carl C. Batz
Attorney.

United States Patent Office 2,733,153
Patented Jan. 31, 1956

2,733,153

MEAT-SHAPING METHOD

Chester A. Hammerberg, Des Plaines, Ill., assignor to Armour and Company, Chicago, Ill., a corporation of Illinois Original application May 12, 1947, Serial No. 747,359. Divided and this application November 24, 1951, Serial No. 258,069

5 Claims. (Cl. 99—194)

This invention relates to a meat-shaping method. The invention is particularly useful in the shaping of irregular cuts of meat, such as beef tenderloin, so as to produce a product of relatively uniform contour and dimensions.

The present application constitutes a division of my co-pending application Serial No. 747,359, which issued as United States Patent No. 2,625,876 on January 20, 1953.

In attempts to shape meat, such as beef tenderloin, which has unusual contours, great difficulty is presented because of the tendency of portions of the meat to fold or bend. Such excessive folding or bending in a mold causes the meat to separate when it is ultimately cut or cooked.

An object of the present invention is to provide a method for shaping meat while eliminating excessive folding or bending. Yet another object is to provide a means and method for shaping irregular cuts of meat under pressure within the confines of a mold while preventing excessive bending or folding of the cuts and then freezing the product while confined under pressure in the desired shape. Other specific objects and advantages will appear as the specification proceeds.

The invention is illustrated, in one embodiment, by the accompanying drawing, in which—

Figure 1 is a central vertical sectional view of an apparatus which can be used in carrying out the process of my invention; Fig. 2, a top plan view; Fig. 3, a vertical sectional view of the top portion of the apparatus with the clamp means affixed thereto; and Fig. 4, a perspective view of the clamp means employed.

In the illustration given, 10 designates a mold which may be of any desired shape or cross section and formed of any suitable material. In the illustration given, a mold 10 is in the form of a pipe mold having its bottom portion turned inwardly to form an annular bottom flange 11 and its top portion turned outwardly to form a locking flange 12. Resting upon the bottom flange 11 is a removable bottom plate 13 apertured centrally at 14.

Various important meat portions have irregular contours and present a great problem in a meat shaping operation. For example, a beef tenderloin, as illustrated by the numeral 15 in Fig. 1, has a large bulky portion at one end while the other end tapers toward a point. If the tenderloin is folded or overlapped upon itself in the shaping operation, a highly unsatisfactory product is obtained because in the cooking operation, the meat tends to separate and unfold. I have found that an effective solution of the problem can be brought about by threading the tenderloin upon a pin 16 fixed centrally to a base plate 17, the pin being extended through the mold 10. As shown more clearly in the central portion of Fig. 1, the uncompressed tenderloin 15 is threaded upon the pin 16 so that the pin passes first through the enlarged portion of the tenderloin, and then upwardly through the tapered portion.

A tamping or pressure-exerting member 19 is provided with a hollow handle 20 provided with a hand piece 21 at the top thereof. The weighted tamping member is apertured to receive the pin 16, and the pin also extends upwardly into the members 20 and 21.

After one of the tenderloin portions 15 has been compacted, within the molding, a partition plate or block 18, apertured to receive the pin 16, is placed in position, as illustrated in Fig. 1. The compressed tenderloin is indicated by the numeral 15A. A second tenderloin portion 15 may then be threaded upon the pin, as indicated in the intermediate portion of Fig. 1, and after this has been compacted, a second block or partition plate 18 is placed in position, and so on until the pipe mold 10 is filled. The mold may be of such a length as to receive three beef tenderloins or any larger or lesser number.

After the mold has been filled, I prefer to employ a clamp pressure device 22, as illustrated more clearly in Figs. 2 and 3. Such a device is of well-known construction and need not be described in detail herein. It provides a plate 23 engaging the top of the meat, and it is equipped with spring-urged members 24 pivotally mounted on the standards 25, each member 24 having depending latch arms 26 engageable with the flange 12 of the mold 10. As shown more clearly in Figs. 2, 3, and 4, the pivotally mounted members 24 are equipped with depending latch arms 26 which engage the flange 12 of the mold 10 to lock the plate 23 against the contents of the mold. It will be observed that the latch arms 26 may ratchet over the flange 12 as pressure is exerted upon the clamp device so that the pressure plate 23 will be held in its lowermost position by the engagement of large arms 26 with the flange 12. The frame of the structure permits the pin 16 to extend therethrough.

The method is conveniently set out in connection with the shaping of beef tenderloin, but it will be understood that both the apparatus and method are readily applicable to other forms of meat. In operating the apparatus, I first insert the pin 16 in position, as shown in Fig. 1, with the plate 17 resting below the base flange 11 of mold 10. The plate 13 is then dropped into position against the bottom of the mold and the first tenderloin 15 is filed upon the pin with the pin extending longitudinally through the tenderloin so that the thin or tapered portion of the tenderloin is centrally filed upon the pin. In other words, the tenderloin is extended and filed longitudinally upon the pin. The tamping member 19 is then brought into place upon the top of the tenderloin 15 so that it is compressed longitudinally upon itself. There is, thus, substantially no folding of the tenderloin upon itself and, instead, the tenderloin is compacted longitudinally of itself. After the compacting operation, just described, a division block or partition plate 18 is dropped upon the compacted tenderloin portion 15A and a new tenderloin 15 is filed upon the pin 16, as illustrated in Fig. 1. This operation is repeated three or four times and until the mold 10 is filled. The tamping members 19, 20, and 21 are removed. The pressure device 22 is then applied in its usual manner with its notched arms 26 engaging the outwardly extending flange 12 of the mold 10. The pin 16 and its plate 17 are removed. The mold 10 with the tenderloin portions 15A held between the blocks 18 and under the top compressing device 22 is then placed within the freezing apparatus.

It is found that meat of irregular contour treated as above described has a desirable flat shape, upon removal from the freezing apparatus, and does not have excessive bending or folding. Further, upon being ultimately cut and cooked, the meat does not tend to separate. Instead, the molded product, having the contour of the mold, may be readily sliced into uniform cuts which retain their molded shape.

While in the foregoing specification, I have described the method in great detail for the purpose of illustrating one embodiment of the invention, it will be understood that such details may be modified widely by those skilled in the art without departing from the spirit of my invention.

I claim:

1. In a process for shaping meat, the steps of longitudinally pinning a meat body to provide an internal support therefor, compacting the pinned body within a mold and in a direction substantially parallel to said support to shape the body to the mold and thereafter freezing the compacted meat while maintaining the same under pressure.

2. In a process for shaping meat, the steps of longitudinally pinning a meat body through approximately its center, compacting the meat in a direction substantially parallel to its length to shape the same within a mold, and thereafter freezing the compacted meat while retaining it under pressure.

3. In a process for shaping beef tenderloin, the steps of longitudinally pinning the bulk and tapered portions through substantially the centers thereof, compressing the portions against each other within a mold and freezing the compacted meat while retaining the same under pressure within the mold.

4. In a process for shaping meat, the steps of inserting a pin longitudinally through the meat, pressing the meat along the pin to cause it to fill the space within a mold, withdrawing said pin from the meat, and freezing the meat while maintaining it under pressure within said mold.

5. In a process for shaping beef tenderloin, the steps of inserting a pin substantially longitudinally and centrally through the meat body, compacting said body along said pin while retaining same within a mold and freezing the compacted meat body while maintaining it under pressure within said mold.

References Cited in the file of this patent
UNITED STATES PATENTS

| Number | Name | Date |
|---|---|---|
| 584,322 | Bryson | June 15, 1897 |
| 1,936,814 | Wetta | Nov. 28, 1933 |
| 2,084,806 | Hubenet | June 22, 1937 |
| 2,119,716 | McKee | June 7, 1938 |
| 2,210,765 | Mahlke | Aug. 6, 1940 |